US012627595B2

(12) United States Patent
Nandy et al.

(10) Patent No.: US 12,627,595 B2
(45) Date of Patent: May 12, 2026

(54) EFFICIENT DISTRIBUTION OF MULTI-DESTINATION PACKETS IN AN OVERLAY NETWORK

(71) Applicant: HEWLETT PACKARD ENTERPRISE DEVELOPMENT LP, Spring, TX (US)

(72) Inventors: Tathagata Nandy, Bangalore (IN); Somnath Bhimaram Lohar, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 242 days.

(21) Appl. No.: 18/609,497

(22) Filed: Mar. 19, 2024

(65) Prior Publication Data

US 2025/0227055 A1     Jul. 10, 2025

(30) Foreign Application Priority Data

Jan. 10, 2024   (IN) ............................. 202441001869

(51) Int. Cl.
*H04L 45/16*        (2022.01)
*H04L 45/64*        (2022.01)
*H04L 45/76*        (2022.01)

(52) U.S. Cl.
CPC .............. *H04L 45/16* (2013.01); *H04L 45/64* (2013.01); *H04L 45/76* (2022.05)

(58) Field of Classification Search
CPC ......... H04L 45/16; H04L 45/64; H04L 45/76; H04L 45/484
See application file for complete search history.

(56) References Cited

U.S. PATENT DOCUMENTS

2021/0044445 A1 *   2/2021   Bottorff ................ H04L 12/185
2021/0112020 A1 *   4/2021   Radhakrishnan ....... H04L 12/66

* cited by examiner

*Primary Examiner* — Brian Whipple
(74) *Attorney, Agent, or Firm* — Hewlett Packard Enterprise Patent Department

(57)        ABSTRACT

A network device operating as a tunnel endpoint in an overlay network is provided. During operation, the network device can receive a multi-destination packet associated with a virtual local area network (VLAN) via an edge port of the network device. The network device can determine a multicast group assigned for distributing multi-destination traffic of the VLAN from a data structure in forwarding hardware of the network device. The network device can then forward the multi-destination packet via a root-path multicast tree associated with the multicast group. Subsequently, the network device can receive forwarding information shared by a second network device of the overlay network based on a control packet sent by the second network device. The network device can then program, in the forwarding hardware, a shortest-path multicast tree associated with the multicast group, wherein the shortest-path multicast tree is for distributing traffic belonging to the VLAN.

20 Claims, 7 Drawing Sheets

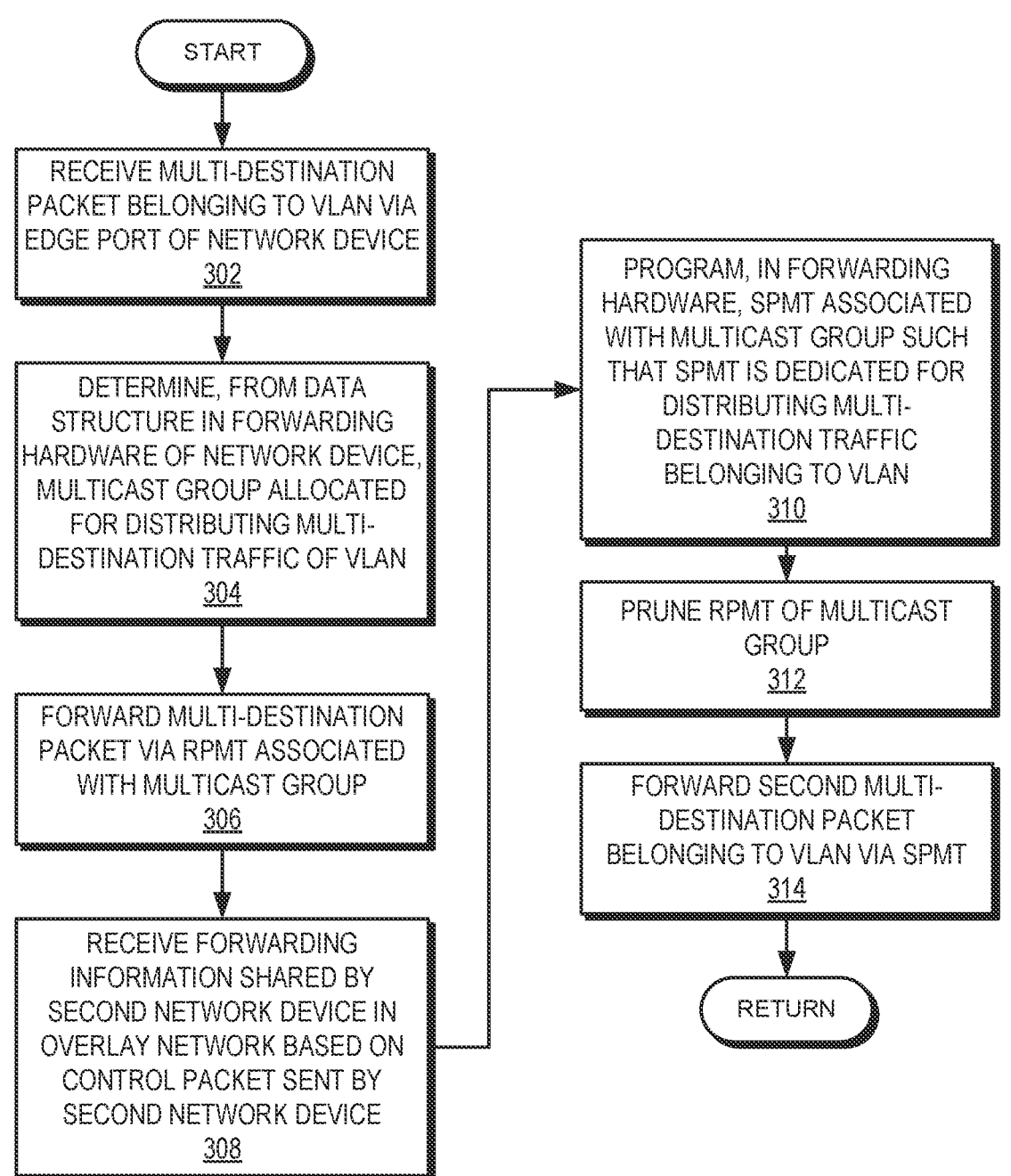

START

RECEIVE MULTI-DESTINATION PACKET BELONGING TO VLAN VIA EDGE PORT OF NETWORK DEVICE
302

DETERMINE, FROM DATA STRUCTURE IN FORWARDING HARDWARE OF NETWORK DEVICE, MULTICAST GROUP ALLOCATED FOR DISTRIBUTING MULTI-DESTINATION TRAFFIC OF VLAN
304

FORWARD MULTI-DESTINATION PACKET VIA RPMT ASSOCIATED WITH MULTICAST GROUP
306

RECEIVE FORWARDING INFORMATION SHARED BY SECOND NETWORK DEVICE IN OVERLAY NETWORK BASED ON CONTROL PACKET SENT BY SECOND NETWORK DEVICE
308

PROGRAM, IN FORWARDING HARDWARE, SPMT ASSOCIATED WITH MULTICAST GROUP SUCH THAT SPMT IS DEDICATED FOR DISTRIBUTING MULTI-DESTINATION TRAFFIC BELONGING TO VLAN
310

PRUNE RPMT OF MULTICAST GROUP
312

FORWARD SECOND MULTI-DESTINATION PACKET BELONGING TO VLAN VIA SPMT
314

RETURN

FIG. 3

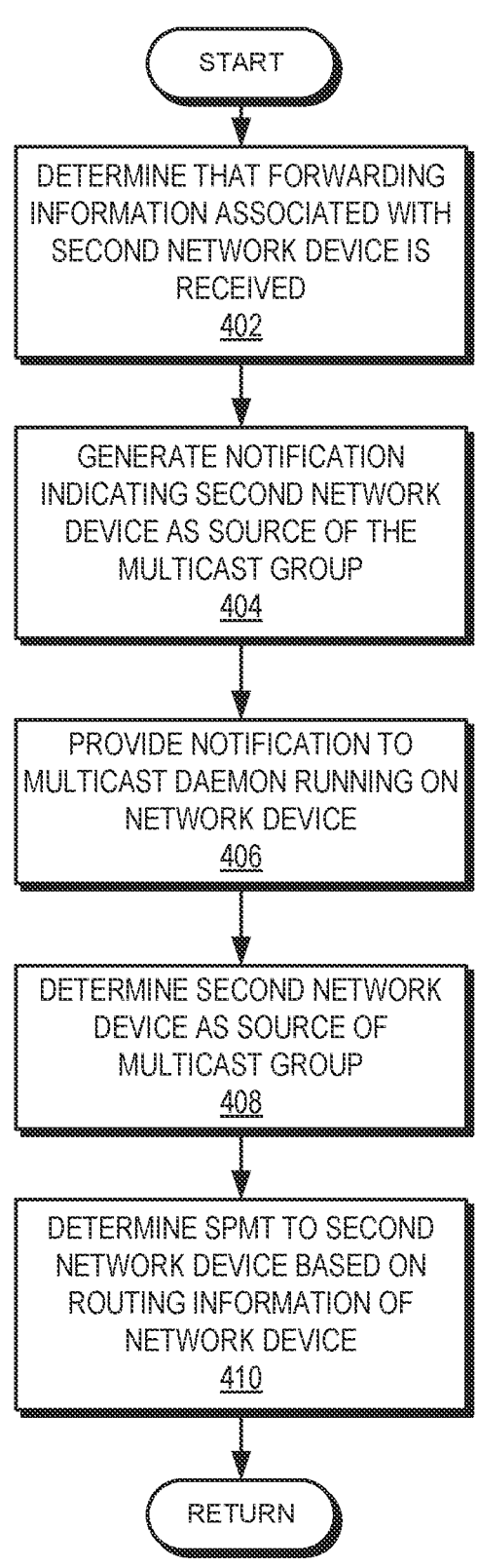

START

DETERMINE THAT FORWARDING
INFORMATION ASSOCIATED WITH
SECOND NETWORK DEVICE IS
RECEIVED
402

GENERATE NOTIFICATION
INDICATING SECOND NETWORK
DEVICE AS SOURCE OF THE
MULTICAST GROUP
404

PROVIDE NOTIFICATION TO
MULTICAST DAEMON RUNNING ON
NETWORK DEVICE
406

DETERMINE SECOND NETWORK
DEVICE AS SOURCE OF
MULTICAST GROUP
408

DETERMINE SPMT TO SECOND
NETWORK DEVICE BASED ON
ROUTING INFORMATION OF
NETWORK DEVICE
410

RETURN

FIG. 4

START

RECEIVE CONTROL PACKET
COMPRISING FORWARDING
INFORMATION ASSOCIATED WITH
SECOND NETWORK DEVICE
502

DETERMINE, FROM FORWARDING
INFORMATION, THAT VLAN SPANS
NETWORK DEVICE AND SECOND
NETWORK DEVICE
504

IDENTIFY SECOND NETWORK
DEVICE AS SOURCE FOR
MULTICAST GROUP ASSOCIATED
WITH VLAN
506

TRIGGER SWITCHOVER TO SPMT
AT MULTICAST DAEMON
508

RETURN

EFFICIENT DISTRIBUTION OF MULTI-DESTINATION PACKETS IN AN OVERLAY NETWORK

BACKGROUND

In a network, a network device, such as a switch, may support different protocols and services. For example, the network device can support an overlay network formed based on tunneling and virtual private networks (VPNs). The network device can then facilitate overlay routing for a VPN over the tunnels.

BRIEF DESCRIPTION OF THE FIGURES

FIG. 3 presents a flowchart illustrating an example of a process of a network device efficiently distributing multi-destination traffic in an overlay network based on underlay multicast distribution, in accordance with an aspect of the present application.

FIG. 4 presents a flowchart illustrating an example of a process of a network device initiating the distribution of multi-destination traffic in an overlay network using an SPMT in an underlay network, in accordance with an aspect of the present application.

In the figures, like reference numerals refer to the same figure elements.

DETAILED DESCRIPTION

Figure 1:
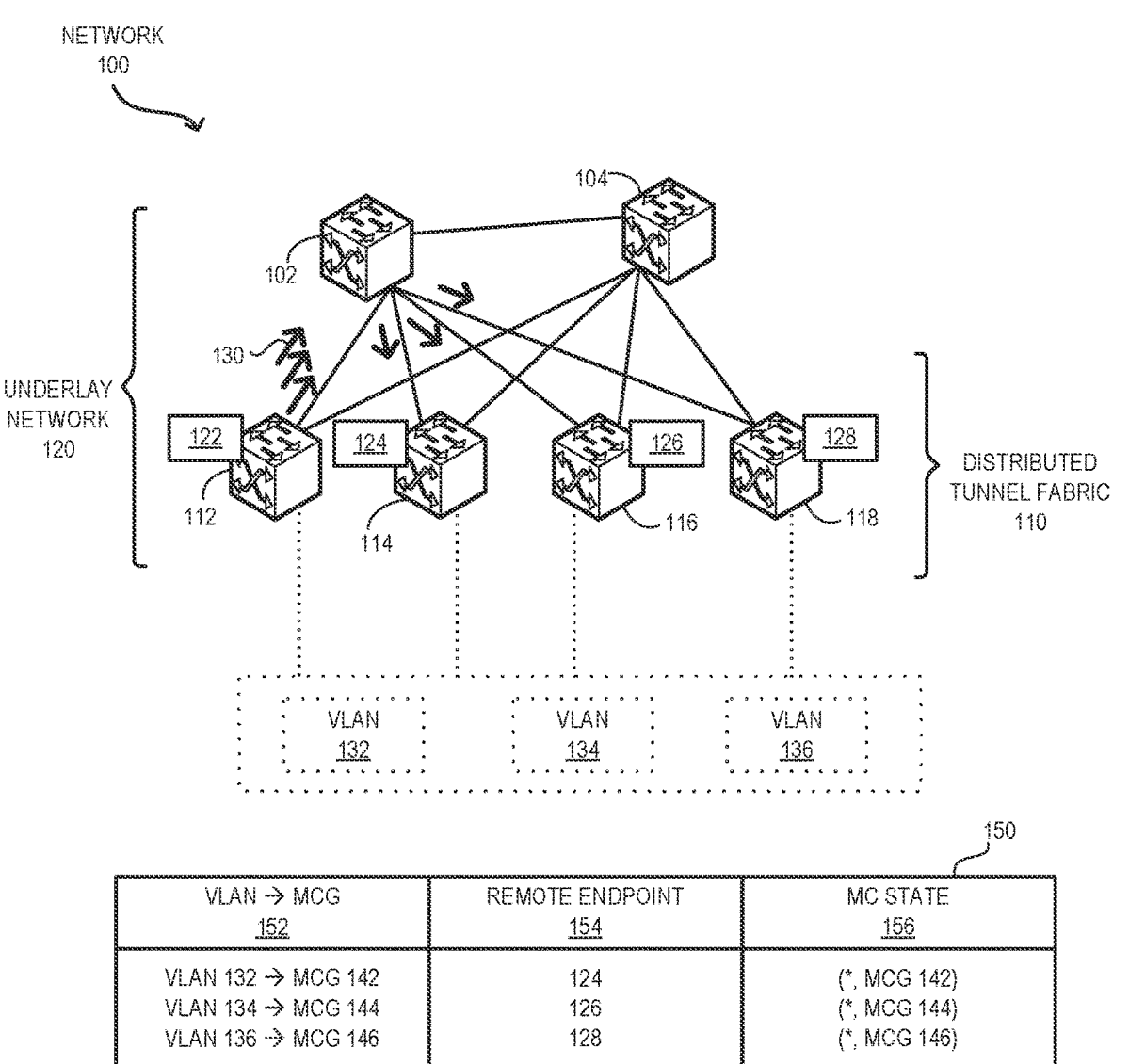
FIG. 1 illustrates an example of an overlay network supporting efficient distribution of multi-destination traffic, in accordance with an aspect of the present application.

In various Internet applications, multicast is frequently used to distribute content from a source to multiple hosts via one or more network devices, such as switches. Efficient distribution of multicast traffic can improve the performance of a network. A network-layer multicast protocol, such as protocol-independent multicast (PIM), can be used for distributing content in a heterogeneous network. In some scenarios, a host can send a client join request (e.g., an Internet Group Management Protocol (IGMP) join request or a Multicast Listener Discovery (MLD) join request) to an upstream network device. The network device can be in an overlay network formed based on overlay routing for a VPN over a set of tunnels. For example, an Ethernet VPN (EVPN) can be deployed as an overlay over a set of virtual extensible local area networks (VXLANs).

To deploy a VPN over the tunnels, a respective tunnel endpoint may map a respective client VLAN to a corresponding tunnel network identifier (TNI), which can identify a virtual network for a tunnel. The TNI may appear in a tunnel header that encapsulates a packet and is used for forwarding the encapsulated packet via a tunnel. For example, if the tunnel is formed based on VXLAN, the TNI can be a virtual network identifier (VNI) of a VXLAN header, and a tunnel endpoint can be a VXLAN tunnel endpoint (VTEP). A TNI can also be mapped to the virtual routing and forwarding (VRF) associated with the tunnels if layer-3 routing and forwarding are needed. A VPN can be distributed across an overlay network. An overlay network with a VPN can also be referred to as a distributed tunnel fabric.

Since the fabric is an overlay network, a respective network device in the fabric can be a tunnel endpoint of one or more tunnels. The fabric can include a gateway device that can facilitate external communication for the fabric. As a result, any other network device of the fabric can communicate with a network device outside the fabric via the gateway device, thereby facilitating communication between networks. On the other hand, internal unicast communication between a network device pair within a fabric can be via a tunnel between the pair. However, the distribution of multi-destination traffic, such as broadcast, unknown unicast, and multicast (BUM) traffic, can then include traffic replication at a respective tunnel.

The aspects described herein address the problem of efficiently distributing multi-destination traffic in an overlay network by (i) distributing multi-destination traffic in the overlay network using a multicast tree in the underlay network; (ii) maintaining a single multicast state associated with an RPMT for a respective virtual local area network (VLAN); and (iii) switching to an SPMT based on the discovery of the VLAN at another network device in the overlay network.

Typically, when multicast traffic is distributed from a source of the overlay multicast group, the network device coupling the source (i.e., the ingress network device of the overlay network) can be responsible for distributing the multicast traffic. Accordingly, the network device can replicate the multicast traffic and distribute it via individual tunnels to requesting network devices. Therefore, the multicast traffic can be distributed over tunnels in the overlay network. In contrast, the multicast tree in the underlay network can distribute the multi-destination traffic to all other network devices in the overlay network without replicating it for individual tunnels. The network device can forward the multi-destination traffic to the Rendezvous Point (RP) of the RPMT. When the source is discovered by other network devices, those network devices can switch to the SPMT toward the network device coupling the source.

An overlay network, such as a distributed tunnel fabric (i.e., an overlay network with a VPN), can be formed when multiple network devices are coupled to each other via corresponding tunnels. In other words, a respective pair of network devices in the overlay network can be coupled to each other via a tunnel. Therefore, a respective network device in the overlay network can be a tunnel endpoint. In the underlying (or underlay) network of the overlay network, a respective network device can establish a route to every other network device. The network device can use a routing protocol, such as the Border Gateway Protocol (BGP), to establish the route.

When a packet is forwarded via a tunnel, the packet is encapsulated with a tunnel header and forwarded via the corresponding route in the underlay network. Hence, to forward a multi-destination packet, such as an Address Resolution Protocol (ARP) request packet, the ingress network device can replicate the packet for a respective tunnel, encapsulate the replicated packet with a tunnel encapsulation header associated with the tunnel, and forward the encapsulated packet via the tunnel. The multi-destination packet can be a broadcast, unknown unicast, or multicast packet. Since the replication and forwarding are repeated for the tunnels to other network devices in the overlay network, the distribution of a multi-destination packet in the overlay network can be inefficient.

To enhance the distribution process, multi-destination packets are often distributed using a multicast tree in the overlay network. The multicast tree can be associated with a multicast group allocated for distributing traffic of a VLAN. Here, the VLAN can be mapped to the multicast group, and accordingly, multi-destination packets belonging to the VLAN can be distributed via the multicast tree. A multi-destination packet can belong to a VLAN if the header of the packet includes the corresponding VLAN identifier or tag. Hence, the end device sending the packet can be configured with the VLAN. The VLAN can indicate the distribution domain (e.g., a broadcast domain) for the packet. The distribution domain can indicate to which devices the multi-destination packet should be distributed.

Such an end device associated with a VLAN can be coupled to any of the network devices in the overlay network. As a result, for each VLAN and its corresponding multicast group, a network device can maintain a multicast state entry for every other network device in a data structure in the forwarding hardware of the network device. As the number of VLANs increases, the number of entries can increase geometrically (i.e., the number of VLANs multiplied by the number of remote network devices in the overlay network), which becomes a scalability problem.

To address this issue, instead of maintaining states for every other network device, the network device can maintain a single multicast state for the multicast group associated with each VLAN. Therefore, a respective entry of the data structure can maintain the multicast state associated with a VLAN for all network devices of the overlay network. For example, if the multicast group is G, the entry can maintain a (*, G) state, which is a generic state for multicast group G without specifying a source (as indicated by "*"). As a result, multicast data from any source can match the (*, G) state. Consequently, even if the number of network devices in the overlay network is large, a single entry can represent the multicast group. This significantly reduces the number of entries in the data structure.

Because the entries may not specify the Internet Protocol (IP) addresses of individual network devices, the distribution of traffic can be via an RPMT of the multicast group instead of an SPMT toward a particular network device. The RPMT can be rooted at the RP of the multicast group. If the network is a spine and leaf network, a set of leaf devices can be coupled to another set of spine devices in a tree topology. The spine devices typically facilitate communication among the leaf devices. The leaf devices can be coupled to end devices and receive traffic from them. The spine devices can then operate as aggregation devices that can aggregate traffic from one or more leaf devices. In addition to operating as an aggregation device, a spine device may couple end devices as well. In an overlay network, the leaf devices can be the overlay network devices (i.e., tunnel endpoints). The spine devices can be the underlay devices participating in the routing protocol of the underlay network (e.g., using respective BGP instances). The leaf devices can also be in the underlay network and participate in the routing protocol of the underlay network. Because both spine and leaf devices can participate in the routing protocol, the forwarding paths of the tunnels of the overlay network can span both spine and leaf devices in the underlay network. Therefore, the spine devices can be the underlay network devices via which the tunnels are established. For example, when a leaf device receives a packet from an end device, the leaf device can encapsulate the packet with a tunnel encapsulation header and forward the encapsulated packet via a corresponding tunnel in the overlay network. The leaf device can forward the encapsulated packet to a spine device via a corresponding path in the underlay network. The spine device can then forward the encapsulated packet toward the destination (i.e., the other endpoint of the tunnel) based on the encapsulation header (e.g., an outer IP address of the encapsulation header). Since the traffic of the overlay network can be distributed via the spine devices, a subset of the spine devices can be preconfigured as the RPs.

A respective network device can forward multi-destination traffic of the multicast group to the RP regardless of their respective paths. As a result, traffic from some network devices can be forwarded to the RP via longer paths. Hence, using the RPMT to distribute can be less efficient than using the SPMT. Typically, when a network device discovers forwarding information, such as a new media access control (MAC) address on a VLAN, the network device can share the information with other network devices in the overlay network. For example, the network device can include the information in a control packet and send the control packet to all other network devices. The control packet can be a route update packet (e.g., an EVPN type-3 route update packet) for the overlay network. The network devices in the overlay network can use route update packets to share forwarding information, such as a learned MAC address, a corresponding VLAN, a new route, etc., with each other. Upon receiving the route update packet, a network device can identify a remote network device associated with the VLAN in the overlay network.

The network device can then determine that the VLAN is configured at the remote network device. Therefore, if a multi-destination packet is to be distributed in the VLAN, the remote network device can be the source of such a packet. Accordingly, the network device can determine an SPMT associated with the remote network device. The network device can use the local routing information obtained based on BGP to determine the shortest path to the remote network device. In some examples, the network device can provide a notification to the local multicast daemon (e.g., the PIM daemon on the network device). The notification can indicate that multicast traffic associated with the multicast group is detected from a local port (i.e., port of the network device), and no corresponding forwarding entry is detected in the forwarding hardware.

However, since the forwarding hardware can be configured with an entry associated with the RPMT of the multicast group, a packet destined to the multicast address of the multicast group can be matched with the entry. Hence, the forwarding hardware can terminate the forwarding of the packet and remove the header. As a result, the multicast daemon may not receive such a notification by default. To initiate the switchover, the notification is generated based on the forwarding information and is provided to the multicast daemon. Accordingly, this notification can trigger the multicast daemon to initiate the switchover to the SPMT. The network device can then program a corresponding entry in the data structure in the forwarding hardware. The network device can also send a prune request to the RP to remove itself from the RPMT. Hence, the subsequent multi-destination packets belonging to the VLAN can then be forwarded via the SPMT. In this way, the network device can efficiently program multicast entries in the forwarding hardware to ensure the efficient distribution of multi-destination packets.

In this disclosure, the term "switch" is used in a generic sense, and it can refer to any standalone network device or fabric switch operating in any network layer. "Switch" should not be interpreted as limiting examples of the present invention to layer-2 networks. Any device that can forward traffic to an external device or another switch can be referred to as a "switch." Furthermore, if the switch facilitates communication between networks, the switch can be referred to as a gateway switch. Any physical or virtual device (e.g., a virtual machine or switch operating on a computing device) that can operate as a network device and forward traffic to an end device can be referred to as a "switch." If the switch is a virtual device, the switch can be referred to as a virtual switch. Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting examples of the present invention to a particular layer of a network protocol stack. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

FIG. 1 illustrates an example of an overlay network supporting efficient distribution of multi-destination traffic, in accordance with an aspect of the present application. A network 100 can include a number of network devices (e.g., switches), and may include heterogeneous network components, such as layer-2 and layer-3 hops, and tunnels. In some examples, network 100 can be an Ethernet network, Infini-Band network, or other network, and may use a corresponding communication protocol, such as Internet Protocol (IP), FibreChannel over Ethernet (FCOE), or other protocol. Network 100 can include a number of network devices 102, 104, 112, 114, 116, and 118. A respective network device in network 100 can be associated with a MAC address and an IP address. IP addresses 122, 124, 126, and 128 can be allocated to network devices 112, 114, 116, and 118, respectively.

Network devices 112, 114, 116, and 118 can operate as tunnel endpoints in an overlay network 110, such as a distributed tunnel fabric 110, where the network devices can be coupled to each other via tunnels. Therefore, network devices 112, 114, 116, and 118 can be in fabric 110. For these network devices, tunnel encapsulation is initiated and terminated within fabric 110. Network devices in fabric 110 may form a mesh of tunnels. Examples of a tunnel can include, but are not limited to, VXLAN, Generic Routing Encapsulation (GRE), Network Virtualization using GRE (NVGRE), Generic Networking Virtualization Encapsulation (Geneve), Internet Protocol Security (IPsec), and Multiprotocol Label Switching (MPLS). A VPN, such as an EVPN, can be deployed over fabric 110. The tunnels in fabric 110 can be formed over an underlay network 120.

Underlay network 120 can be a physical network, and a respective link of the underlying network can be a physical link.

A respective network device in fabric 110 can also be in underlay network 120. On the other hand, a network device operating as a tunnel endpoint can be in fabric 110. A respective pair of network devices in underlay network 120 can be a BGP peer. Therefore, in underlay network 120, a respective network device can use BGP to establish routes via which packets are forwarded. Accordingly, the encapsulated packets of fabric 110 can be forwarded via these routes in underlay network 120. In some examples, network 100 can be a spine and leaf network wherein network devices 112, 114, 116, and 118 can be leaf devices, and network devices 102 and 104 can be spine devices. Here, leaf devices 112, 114, 116, and 118 can be in fabric 110 as tunnel endpoints. These leaf devices can also be in underlay network 120 where they participate in the BGP routing of underlay network 120. On the other hand, spine devices 102 and 104 can be in underlay network 120 via which the tunnels of fabric 110 are established. Here, spine devices 102 and 104 can forward encapsulated packets of fabric 110 via underlay network 120 based on the corresponding tunnel headers. Under such a network topology, spine devices 102 and 104 can operate as aggregation devices that can aggregate traffic from leaf devices 112, 114, 116, and 118.

In this example, VLANs 132, 134, and 136 can be configured on leaf devices 112, 114, 116, and 118. During operation, network device 112 can distribute a multi-destination packet 130 associated with VLAN 132 in fabric 110. Here, packet 130 can be an ARP request packet in VLAN 132. VLAN 132 can indicate the distribution domain (e.g., a broadcast domain) for packet 130. Accordingly, since VLAN 132 is configured on network devices 114, 116, and 118, network device 112 can replicate packet 130 for each of network devices 114, 116, and 118. Network device 112 can encapsulate a respective replicated packet 130 with a tunnel encapsulation header associated with the corresponding tunnel and forward the encapsulated packet 130 via the tunnel. Since the replication and forwarding are repeated for each of network devices 114, 116, and 118, the distribution of packet 130 in fabric 110 can be inefficient.

To enhance the distribution process, packet 130 can be distributed using a multicast tree in fabric 110. The multicast tree can be associated with a multicast group 142 allocated for distributing traffic of VLAN 132. Similarly, multicast groups 144 and 146 can be allocated for distributing traffic of VLANs 134 and 136, respectively. Network device 112 can maintain the mapping between a VLAN and the multicast group a data structure 150 in the forwarding hardware of network device 112. Because an end device associated with VLAN 132 can be coupled to any of network devices 114, 116, and 118, data structure 150 may include multicast state entries for corresponding IP addresses 124, 126, and 128 for each multicast groups 142, 144, and 146. Therefore, the number of entries in data structure 150 can be the number of VLANs multiplied by the number of remote network devices in fabric 110. In this example, the number of entries can be nine. Consequently, data structure 150 may incur a scalability problem.

To address this issue, instead of maintaining states for IP addresses 124, 126, and 128, network device 112 can maintain a single multicast state 156 for each of multicast groups 142, 144, and 146. Data structure 150 can maintain respective mappings 152 between VLANs 132, 134, and 136 and corresponding multicast groups 142, 144, and 146, respectively. Therefore, a respective entry of data structure 150 can maintain the multicast state associated with a VLAN of fabric 110 regardless of a remote endpoint 154. For network device 112, a respective remote endpoint 154 can be associated with IP addresses 124, 126, and 128.

Here, if a multicast group is represented as G, the entry can maintain a (*, G) state for the multicast group. Accordingly, data structure 150 can maintain multicast state 156 for (*, multicast group 142), (*, multicast group 144), and (*, multicast group 146) independent of IP addresses 124, 126, and 128. Consequently, even if the number of network devices in fabric 110 is large, a single entry of data structure 150 can represent the multicast group. This significantly reduces the number of entries in the data structure. However, because the entries of data structure 150 do not specify individual switches, the distribution of multi-destination traffic can be via respective RPMTs of multicast groups 142, 144, and 146 instead of the SPMTs.

When network devices 114, 116, and 118 discover forwarding information, such as a new MAC address on VLAN 132, 134, or 136, the information is shared with network device 112. This sharing of information can allow network device 112 to identify a remote network device associated with a VLAN. For example, if network device 114 learns a new MAC address on VLAN 132, network device 114 can send a route update packet to network device 112 with corresponding forwarding information. Accordingly, network device 112 can determine an SPMT for multicast group 142 and program an entry in data structure 150 in the forwarding hardware. The subsequent exchange of multi-destination packets belonging to VLAN 132 between network devices 112 and 114 can be via an SPMT between network devices 112 and 114.

Figure 2A:
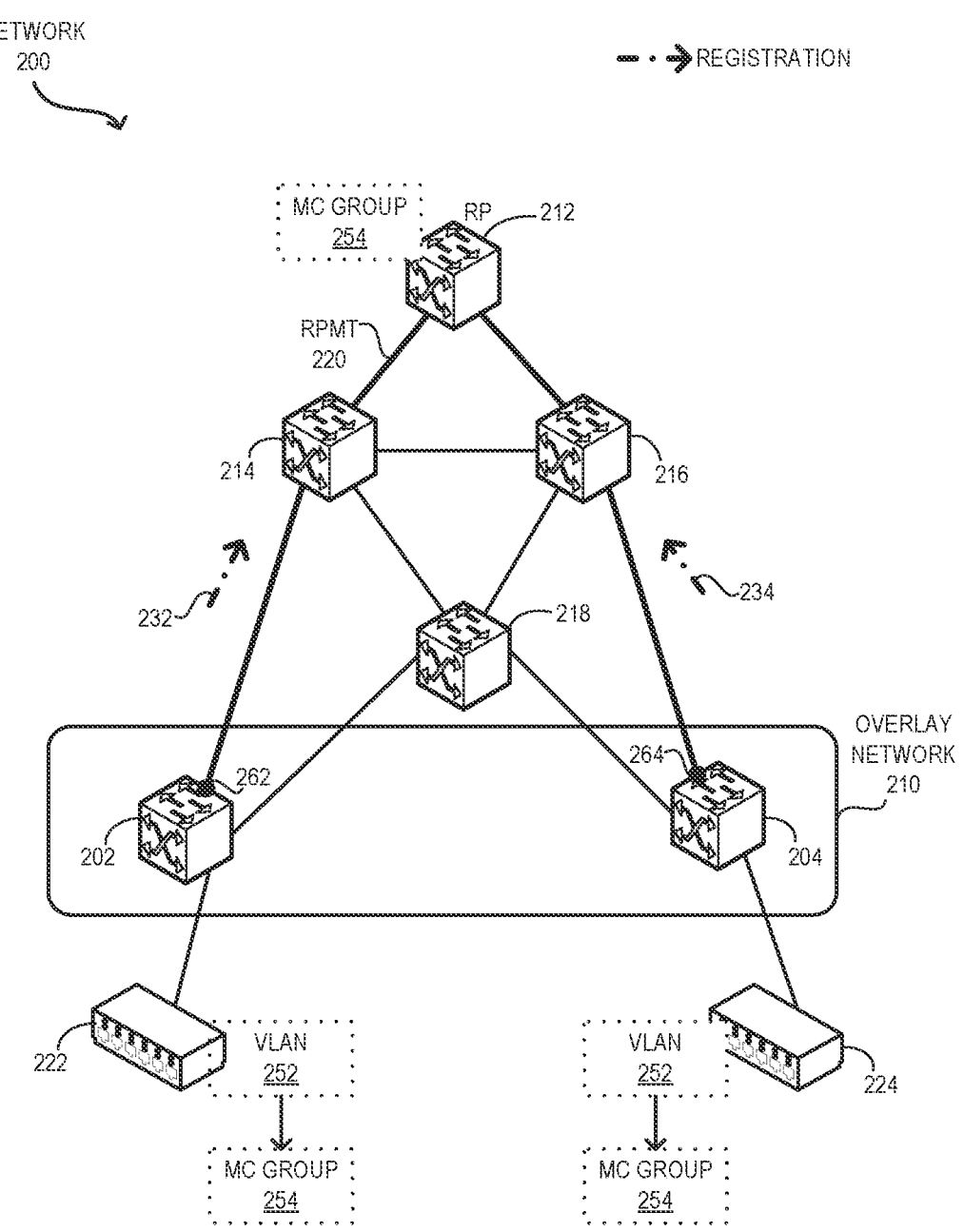
FIG. 2A illustrates an example of a root-path multicast tree (RPMT) in an underlay network distributing multi-destination traffic in an overlay network, in accordance with an aspect of the present application.

FIG. 2A illustrates an example of an RPMT in an underlay network distributing multi-destination traffic in an overlay network, in accordance with an aspect of the present application. A network 200 can include a number of network devices 202, 204, 212, 214, 216, and 218. A respective network device in network 200 can be associated with a MAC address and an IP address. Network devices 202 and 204 can operate as tunnel endpoints in an overlay network 210, where the network devices can be coupled to each other via tunnels. Therefore, network devices 202 and 204 can be in overlay network 210. Overlay network 210 may include other network devices not shown in FIG. 2A. For the network devices in overlay network 210, tunnel encapsulation is initiated and terminated within overlay network 210. Network devices in overlay network 210 may form a mesh of tunnels where a respective network device pair can maintain a tunnel between them in overlay network 210. Examples of a tunnel can include, but are not limited to, VXLAN, GRE, NVGRE, Geneve, IPsec, and MPLS. A VPN, such as an EVPN, can be deployed on overlay network 210. The tunnels in overlay network 210 can be formed over an underlay network. The underlay network can be a physical network, and a respective link of the underlying network can be a physical link.

A respective network device in overlay network 210 can also be in the underlay network. On the other hand, a network device operating as a tunnel endpoint can be in fabric 210. A respective pair of network devices in the underlay network can be a BGP peer. Therefore, in the underlay network, a respective network device can use BGP to establish routes via which packets are forwarded. Accordingly, the encapsulated packets of overlay network 210 can be forwarded via these routes in the underlay network. In some examples, network 200 can be a spine and leaf network wherein network devices 212, 214, 216, and 218 can be spine devices, and network devices 102 and 104 can be leaf devices. Here, leaf devices 202 and 204 can be in overlay network 210 as tunnel endpoints. These leaf devices can also be in the underlay network where they participate in the BGP routing of the underlay network. On the other hand, spine devices 212, 214, 216, and 218 can be in the underlay network via which the tunnels of overlay network 210 are established. Here, spine devices 212, 214, 216, and 218 can forward encapsulated packets of fabric 210 via the underlay network based on the corresponding tunnel headers. Under such a network topology, spine devices 212, 214, 216, and 218 can operate as aggregation devices that can aggregate traffic from leaf devices 202 and 204.

To facilitate the mapping between a VLAN and a corresponding multicast group, a range of underlay multicast groups, which can be represented by a corresponding range of multicast addresses, can be predetermined in network 200. A multicast address can be a multicast IP address. A network administrator can configure this range of multicast groups. For each of these multicast groups, a network device in the underlay network can be preconfigured as an RP. If network 200 is a spine and leaf network, an RP can be configured on one of spine devices 212, 214, 216, and 218. The RPs in network 200 can be distributed among spine devices 212, 214, 216, and 218 in a load-balanced way. For example, if there are eight multicast groups, each of spine devices 212, 214, 216, and 218 can operate as RPs for two multicast groups.

End devices 222 and 224 can be coupled to network devices 202 and 204, respectively, via corresponding edge ports (i.e., a port coupling an end device). End devices 222 and 224 can be customer switches or computing systems. A VLAN 252 can be configured on end devices 222 and 224 and hence, on network devices 202 and 204. When network devices 202 and 204 receive an ARP request packet from end devices 222 and 224, network devices 202 and 204 can learn the MAC addresses of end devices 222 and 224, respectively, on VLAN 252. Upon learning VLAN 252, network devices 202 and 204 can independently apply a mapping rule to VLAN 252 to determine a corresponding multicast group 254 from the range of multicast groups. Because both network devices 202 and 204 can apply the same mapping rule, network devices 202 and 204 can independently map VLAN 252 to multicast group 254 in a distributed way.

Examples of the mapping rule can include, but are not limited to, a hash function, sequential mapping, and random mapping. For the hash-based mapping, network devices 202 and 204 can apply the hash function on VLAN 252 to generate an index (e.g., a non-negative integer). Multicast group 254 can then be selected from the range of predetermined multicast groups based on the index. For example, if the index is i, multicast group 254 can be the ith multicast group in the range of predetermined multicast groups configured for distributing multi-destination packets in network 200. On the other hand, if sequential mapping is used, multicast group 254 can be the next available multicast group in the range of predetermined multicast groups. Furthermore, if random mapping is used, multicast group 254 can be a randomly selected multicast group from the available multicast groups in the range of predetermined multicast groups.

Suppose that network device 212 is configured as the RP for multicast group 254. Network device 212 can also be referred to as RP 212. Network device 202 can determine, based on the route determined by BGP, that RP 212 is reachable via port 262 of network device 202. Network device 202 can then send multicast registration packets 232 associated with multicast group 254 to RP 212 via port 262. Similarly, network device 202 can determine that RP 212 is reachable via port 264 of network device 204. Network device 204 can send multicast registration packets 234 associated with multicast group 254 to RP 212 via port 264. Multicast registration packets 232 and 234 can be based on PIM register packets. In some examples, the respective multicast daemons (e.g., the PIM daemons) of network devices 202 and 204 can send the registration packets to RP 212.

Based on registration packets 232 and 234, network devices 202 and 204, respectively, can join RPMT 220 (denoted with weighted lines) of multicast group 254. Since RPMT 220 can be rooted at RP 212, network devices 202 and 204 can be coupled to RPMT 220 via ports 262 and 264, respectively. Network devices 202 and 204 can then generate an entry associated with RPMT 220 in their respective forwarding hardware. If multicast group 254 is represented as G, the entry can include the (*, G) multicast state representing RPMT 220. However, since an entry can already exist for multicast group 254 in forwarding hardware, network devices 202 and 204 may not trigger a switchover to an SPMT for multicast group 254.

In particular, upon receiving a packet destined to the multicast address of multicast group 254, the forwarding hardware can match the destination address, which can be in an outer IP address field of an encapsulation header, with the entry. Hence, the forwarding hardware of network devices 202 or 204 can terminate the forwarding of the packet and remove the header. As a result, the local multicast daemon may not receive such a notification by default. To initiate the switchover, the notification is generated based on the forwarding information and is provided to the multicast daemon. Accordingly, this notification can trigger the multicast daemon to initiate the switchover to the SPMT.

Figure 2B:
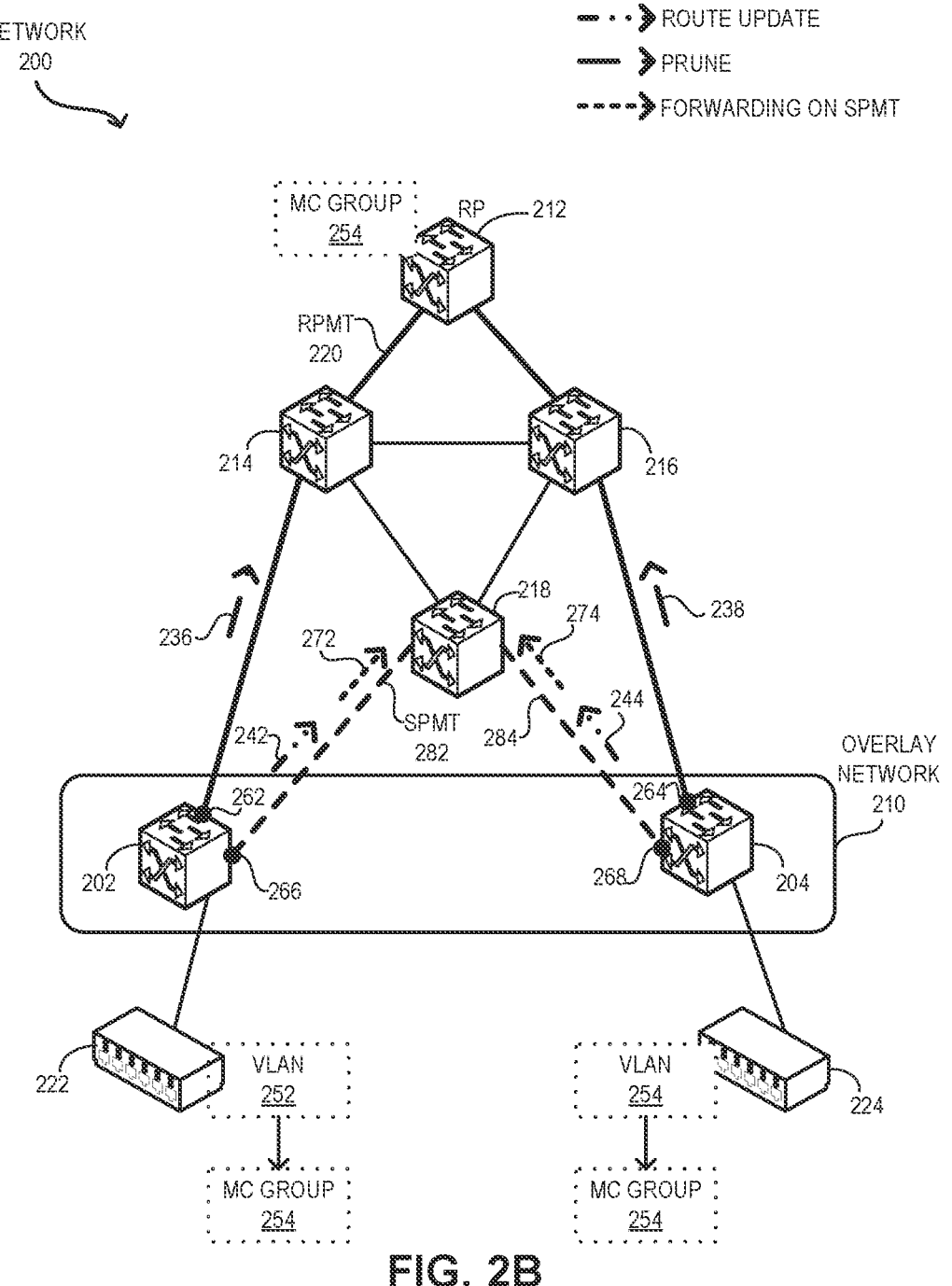
FIG. 2B illustrates an example of switching to a source-specific multicast tree (SPMT) in an underlay network for distributing multi-destination traffic in an overlay network, in accordance with an aspect of the present application.

FIG. 2B illustrates an example of switching to an SPMT in an underlay network for distributing multi-destination traffic in an overlay network, in accordance with an aspect of the present application. Because network devices 202 and 204 are configured to forward multi-destination packets of VLAN 252 via RPMT 220, network devices 202 and 204 can forward these packets to RP 212. As a result, even if there is a shorter path between network devices 202 and 204, multi-destination packets of multicast group 254 from two network devices 202 and 204 can be forwarded on RPMT 220. As a result, multi-destination packets of multicast group 254 from network devices 202 and 204 can be forwarded to RP 212 via longer paths. Hence, using RPMT 220 to distribute can be less efficient than using an SPMT.

When network device 202 receives an ARP request packet from end device 222, network device 202 can learn forwarding information, such as the MAC address of end device 222, in association with VLAN 252. Network device 202 can include the information in a route update packet 242 (e.g., an EVPAN type-3 route update packet) and send packet 242 to all other network devices in overlay network 210. Packet 242 can be forwarded via the shortest path, as determined by the BGP instance, in the underlay network. In this example, the shortest path between network devices 202 and 204 can be via network device 218. Hence, network device 202 can determine that network device 218 is reachable from port 266 of network device 202 and forward packet 242 via port 266.

When network device 202 learns forwarding information, such as the MAC address of end device 224, in association with VLAN 252, network device 204 can include the information in a route update packet 244. Network device 204 can determine that network device 218 is reachable from port 268 of network device 204 and forward packet 244 via port 268. Upon receiving packet 244, network device 202 can determine that VLAN 252 is configured on network device 204 and hence, can be a source of multi-destination packets in VLAN 252. Similarly, upon receiving packet 242, network device 204 can determine that VLAN 252 is configured on network device 202 and hence, can be a source of multi-destination packets in VLAN 252.

Based on packet 244, network device 202 can determine an SPMT 282 (denoted with weighted dashed lines) associated with multicast group 254 to network device 204. Since SPMT 282 can span the shortest path to network device 204, network device 202 can associate port 266 as an egress port for SPMT 282. In some examples, network device 202 can provide a notification to the multicast daemon (e.g., the PIM daemon) of network device 202. The notification can indicate that multicast traffic associated with multicast group 254 is detected from port 266, and no corresponding forwarding entry is detected in the forwarding hardware. This notification can trigger the multicast daemon to initiate the switchover to SPMT 282.

A subsequent multi-destination packet 272 can then be forwarded via port 266 to next-hop network device 218 in the underlay network. Based on the forwarding, the multicast daemon on network device 218 can initiate the switchover to SPMT 282 and forward packet 272 to network device 204. Network device 202 can also send a prune packet 236 (e.g., a PIM prune message) via port 262 to RP 212. Upon receiving packet 236, RP 212 can remove network device 202 from RPMT 220. Furthermore, based on the pruning, network device 202 may remove the forwarding entries associated with RPMT 220 from the forwarding hardware. Network device 202 can also update the data structure in the forwarding hardware to indicate SPMT 282 for multicast group 254. SPMT 282 can be indicated based on the IP address of network device 204 and the multicast IP address of multicast group 254.

Similarly, based on packet 242, network device 204 can determine an SPMT 284 (denoted with weighted dashed lines) associated with multicast group 254 to network device 202. Since SPMT 284 can span the shortest path to network device 202, network device 204 can associate port 268 as an egress port for SPMT 284. A subsequent multi-destination packet 274 can then be forwarded via port 268 to next-hop network device 218 in the underlay network. Based on the forwarding, the multicast daemon on network device 218 can initiate the switchover to SPMT 284 and forward packet 274 to network device 202. Network device 204 can also send a prune packet 238 via port 264 to RP 212. Upon receiving packet 238, RP 212 can remove network device 204 from RPMT 220. Network device 204 can also update the data structure in the forwarding hardware to indicate SPMT 284 for multicast group 254. SPMT 284 can be indicated based on the IP address of network device 202 and the multicast IP address of multicast group 254.

FIG. 3 presents a flowchart illustrating an example of a process of a network device efficiently distributing multi-destination traffic in an overlay network based on underlay multicast distribution, in accordance with an aspect of the present application. During operation, the network device can receive a multi-destination packet belonging to a VLAN via an edge port of the network device (operation 302). An edge port can couple an end device to the network device. Hence, a packet received via an edge port can indicate that the packet is received from an end device (e.g., a customer switch or computing device). Since the packet is a multi-destination packet (e.g., a BUM packet), the network device can distribute the packet via a multicast tree of the underlay network. Therefore, the network device can determine, from a data structure in the forwarding hardware of the network device, a multicast group allocated for distributing multi-destination traffic of the VLAN (operation 304). The multicast group can be selected from a range of multicast groups predefined in the overlay network for distributing multi-destination traffic.

If the multicast group is represented as G, the network device can maintain a (*, G) multicast state for the multicast group. Here, (*, G) multicast state is a source-independent state. Therefore, (*, G) multicast state can correspond to an RPMT associated with the multicast group. Accordingly, the network device can forward the multi-destination packet via the RPMT associated with the multicast group (operation 306). The forwarding can include encapsulating the multi-destination packet with a tunnel encapsulation header and including a multicast IP address of the multicast group in an outer IP address field of the encapsulation header. Based on the multicast IP address, the encapsulated packet can be forwarded to the RP of the multicast group. To switch over to an SPMT, the network device can rely on forwarding information learned from another network device.

The network device can receive forwarding information shared by a second network device in the overlay network based on a control packet sent by the second network device (operation 308). The control packet can be a route update packet (e.g., an EVPN type-3 packet) that can be used to share forwarding information among the network devices of the overlay network. The network device can then program, in the forwarding hardware, an SPMT associated with the multicast group (operation 310). Since the SPMT is associated with the multicast group, the SPMT can be dedicated for distributing multi-destination traffic belonging to the VLAN. Here, the SPMT can be based on the shortest path in the underlay network to the second network device.

Since the SPMT has been established, the network device may no longer need to distribute the traffic of the multicast group via the RPMT. Hence, the network device can prune the RPMT of the multicast group (operation 312). To prune the RPMT, the network device can send a prune packet (e.g., a PIM prune message) to the RP of the multicast group. Based on the pruning, the network device can be removed from the RPMT. Furthermore, based on the pruning, the network device may remove the forwarding entries associated with the RPMT from the forwarding hardware. Therefore, the network device can forward a subsequent second multi-destination packet belonging to the VLAN via the SPMT (operation 314).

FIG. 4 presents a flowchart illustrating an example of a process of a network device initiating the distribution of multi-destination traffic in an overlay network using an SPMT in an underlay network, in accordance with an aspect of the present application. During operation, the network device can determine that the forwarding information associated with a second network device is received (operation 402). The forwarding information can be received based on a control packet, such as a route update packet, received from the second network device. Examples of the forwarding information can include, but are not limited to, a new route, a MAC address learned at the second network device, and a VLAN associated with the MAC address. The network device can generate a notification indicating the second network device as a source of a multicast group (operation 404). The notification can indicate that multicast traffic associated with the multicast group is received from the second multicast group at a local port (i.e., port of the network device), and no corresponding forwarding entry is detected in the forwarding hardware.

The network device can then provide the notification to the multicast daemon (e.g., the PIM daemon) running on the network device (operation 406). The multicast daemon can then determine that a SPMT to the second network device should be constructed. However, since the forwarding hardware can be configured with a (*, G) entry associated with the multicast group, a packet destined to the multicast address of the multicast group can be matched with the entry. Hence, the forwarding hardware can terminate the forwarding of the packet and remove the header. As a result, the multicast daemon may not receive such a notification by default.

To force the switchover, the notification is generated based on the forwarding information and is provided to the multicast daemon. Accordingly, the network device, at the protocol daemon can determine the second network device as a source of the multicast group (operation 408). Subsequently, the network device can determine an SPMT to the second network device based on the routing information of the network device (operation 410). The routing information can be generated by a routing protocol instance (e.g., a BGP instance) running on the network device. The SPMT can be constructed over the shortest path to the second network device, as indicated in the routing information. Hence, the port corresponding to the shortest path can be allocated to the SPMT.

Figure 5:
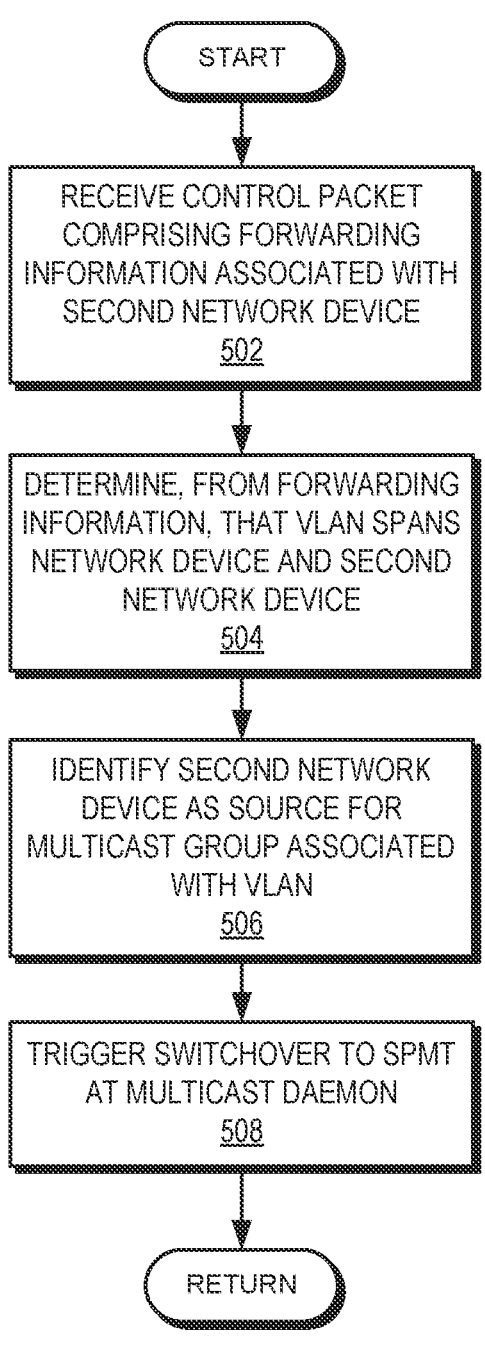
FIG. 5 presents a flowchart illustrating an example of a process of a network device switching to an SPMT in an underlay network for efficiently distributing multi-destination traffic in an overlay network, in accordance with an aspect of the present application.

FIG. 5 presents a flowchart illustrating an example of a process of a network device switching to an SPMT in an underlay network for efficiently distributing multi-destination traffic in an overlay network, in accordance with an aspect of the present application. During operation, the network device can receive a control packet comprising the forwarding information associated with the second network device (operation 502). Here, the forwarding information can indicate that a VLAN is configured at the second network device. Therefore, the network device can determine, from the forwarding information, that the VLAN spans the network device and the second network device (operation 504). If the second network device sends a multi-destination packet, the packet can be distributed in the overlay network based on a multicast group associated with the VLAN. Hence, the network device can identify the second network device as a source for the multicast group associated with the VLAN (operation 506) and trigger a switchover to the SPMT at the multicast daemon (operation 508).

Figure 6:
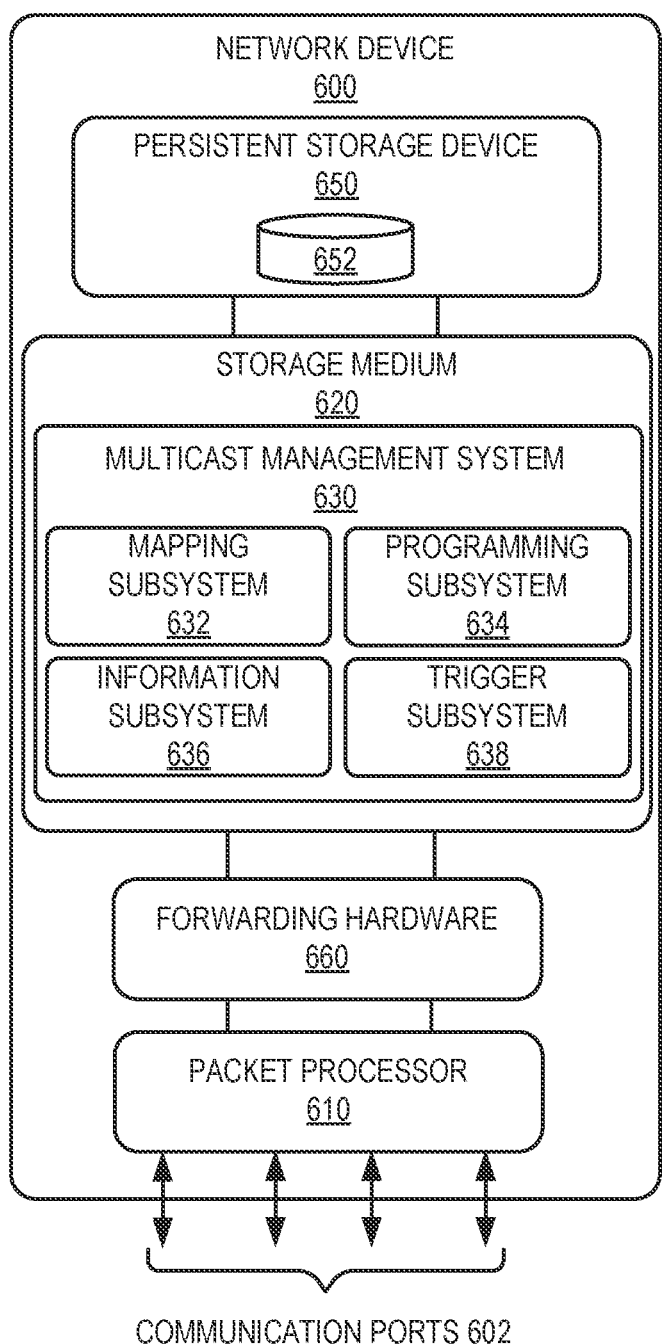
FIG. 6 illustrates an example of a network device supporting the efficient distribution of multi-destination traffic in an overlay network based on underlay multicast distribution, in accordance with an aspect of the present application.

FIG. 6 illustrates an example of a network device supporting the efficient distribution of multi-destination traffic in an overlay network based on underlay multicast distribution, in accordance with an aspect of the present application. In this example, a network device 600, which can also be referred to as a switch 600, can include a number of communication ports 602, a packet processor 610, and a persistent storage device 650. Network device 600 can also include forwarding hardware 660 (e.g., processing hardware of network device 600, such as its application-specific integrated circuit (ASIC) chips), which includes information based on which network device 600 processes packets (e.g., determines output ports for packets).

Packet processor 610 can extract and process header information from the received packets. Packet processor 610 can identify a network device identifier (e.g., a MAC address and/or an IP address) associated with network device 600 in the header of a packet. Network device 600 can include a storage medium 620. In some examples, storage medium 620 can include a set of volatile memory devices (e.g., dual in-line memory module (DIMM)). Network device 600 can operate as a tunnel endpoint in an overlay network (e.g., in a fabric).

Communication ports 602 can include inter-device communication channels for communication with other network devices and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Packet processor 610 can process Ethernet frames and/or IP packets. A respective port of communication ports 602 may operate as an ingress port and/or an egress port.

Network device 600 can maintain a database 652 (e.g., in storage device 650). Database 652 can be a relational database and may run on one or more Database Management System (DBMS) instances. Database 652 can store information associated with the routing, configuration, and interfaces of network device 600. Database 652 may store the routing data structures populated based on a BGP instance running on network device 600. Storage medium 620 can include instructions associated with a multicast management system 630 that can allow network device 600 to efficiently distribute multi-destination traffic in an overlay network.

Multicast management system 630 can include a mapping subsystem 632, a programming subsystem 634, an information subsystem 636, and a trigger subsystem 638. A respective subsystem can include instructions executable by network device 600 to perform one or more operations. Mapping subsystem 632 can include instructions to apply a mapping rule to a VLAN to determine a multicast group configured in the underlay network of the overlay network. Mapping subsystem 632 can also include instructions to identify the RP of the second multicast group.

Forwarding subsystem 634 can include instructions to program an entry in forwarding hardware 660 associated with the RPMT of the multicast group mapped to the VLAN. Information subsystem 636 can include instructions to receive forwarding information from another network device (e.g., via a route update packet of an overlay network) and determine the presence of the VLAN at the other network device. Trigger subsystem 638 can include instructions to trigger a switchover to the SPMT to the other network device by providing a notification to the multicast daemon of network device 600.

The description herein is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the examples shown, but is to be accorded the widest scope consistent with the claims.

One aspect of the present technology can provide a network device operating as a tunnel endpoint in an overlay network. During operation, the network device can receive a multi-destination packet associated with a virtual local area network (VLAN) via an edge port of the network device. The network device can determine a multicast group assigned for distributing multi-destination traffic of the VLAN from a data structure in forwarding hardware of the network device. The network device can then forward the multi-destination packet via a root-path multicast tree associated with the multicast group. Subsequently, the network device can receive forwarding information shared by a second network device of the overlay network based on a control packet sent by the second network device. The network device can then program, in the forwarding hardware, a shortest-path multicast tree associated with the multicast group, wherein the shortest-path multicast tree is for distributing traffic belonging to the VLAN.

In a variation on this aspect, the network device can prune the root-path multicast tree for the multicast group and forward a second multi-destination packet belonging to the VLAN via the shortest-path multicast tree.

In a variation on this aspect, the overlay network deploys an Ethernet virtual private network, and wherein the control packet is a route update packet associated with the Ethernet virtual private network.

In a variation on this aspect, the forwarding information comprises one or more of: a new media access control (MAC) address learned on the VLAN at the second network device, and a new route determined by the second network device.

In a variation on this aspect, a respective entry in the data structure in the forwarding hardware is associated with a multicast group corresponding to a VLAN configured in the overlay network. Furthermore, a source of the multicast group indicated in the entry refers to a respective source of the multicast group in the overlay network.

In a variation on this aspect, the root-path multicast tree and the shortest-path multicast tree are deployed in an underlay network for the overlay network.

In a variation on this aspect, the network device can determine the second network device as a source of the multicast group. The network device can then identify a port of the network device corresponding to the second network device based on routing information of the network device and allocating the port to the shortest-path multicast tree.

In a further variation, upon receiving the forwarding information, the network device can provide a notification to a multicast daemon running on the network device. The notification can indicate the second network device as the source of the multicast group.

In a variation on this aspect, the root-path multicast tree can be rooted at a network device of the overlay network. The network device can be configured as a Rendezvous Point (RP) of the multicast group.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware logic blocks or apparatus. These logic blocks or apparatus may include, but are not limited to, an application-specific integrated circuit (ASIC) chip, a field-programmable gate array (FPGA), a dedicated or shared processor that executes a particular software logic block or a piece of code at a particular time, and/or other programmable-logic devices now known or later developed. When the hardware logic blocks or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method, comprising:
   receiving, by a first network device in an overlay network, a multi-destination packet associated with a virtual local area network (VLAN) via an edge port of the first network device;
   determining, by the first network device, a multicast group assigned for distributing multi-destination traffic of the VLAN from a data structure stored in forwarding hardware of the first network device;
   forwarding, by the first network device, the multi-destination packet via a root-path multicast tree associated with the multicast group;
   receiving, by the first network device, forwarding information shared by a second network device of the overlay network based on a control packet sent by the second network device; and
   programming, in the data structure stored in the forwarding hardware, a shortest-path multicast tree associated with the multicast group, wherein the shortest-path multicast tree is for distributing traffic belonging to the VLAN.

2. The method of claim 1, further comprising:
   pruning, by the first network device, the root-path multicast tree for the multicast group; and
   forwarding, by the first network device, a second multi-destination packet belonging to the VLAN via the shortest-path multicast tree.

3. The method of claim 1, wherein the overlay network deploys an Ethernet virtual private network, and wherein the control packet is a route update packet associated with the Ethernet virtual private network.

4. The method of claim 1, wherein the forwarding information comprises one or more of:
   a new media access control (MAC) address learned on the VLAN at the second network device; and
   a new route determined by the second network device.

5. The method of claim 1, wherein a respective entry in the data structure in the forwarding hardware is associated with a multicast group corresponding to a VLAN configured in the overlay network, and wherein a source of the multicast group indicated in the entry refers to a respective source of the multicast group in the overlay network.

6. The method of claim 1, wherein the root-path multicast tree and the shortest-path multicast tree are deployed in an underlay network for the overlay network.

7. The method of claim 1, further comprising:
   determining, by the first network device, the second network device as a source of the multicast group;

identifying a port of the first network device corresponding to the second network device based on routing information of the first network device; and
   allocating the port to the shortest-path multicast tree.

8. The method of claim 7, further comprising providing, in response to receiving the forwarding information, a notification to a multicast daemon running on the network device, wherein the notification indicates the second network device as the source of the multicast group.

9. The method of claim 1, wherein the root-path multicast tree is rooted at a network device of the overlay network, and wherein the network device is configured as a Rendezvous Point (RP) of the multicast group.

10. A non-transitory computer-readable storage medium storing instructions that, when executed by a processor of a first network device in an overlay network, cause the processor to perform a method, the method comprising:
   receiving a multi-destination packet associated with a virtual local area network (VLAN) via an edge port of the first network device;
   determining a multicast group assigned for distributing multi-destination traffic of the VLAN from a data structure stored in forwarding hardware of the first network device;
   forwarding the multi-destination packet via a root-path multicast tree associated with the multicast group;
   receiving forwarding information shared by a second network device of the overlay network based on a control packet sent by the second network device; and
   programming, in the data structure stored in the forwarding hardware, a shortest-path multicast tree associated with the multicast group, wherein the shortest-path multicast tree is for distributing traffic belonging to the VLAN.

11. The non-transitory computer-readable storage medium of claim 10, wherein the method further comprises:
   pruning, by the first network device, the root-path multicast tree for the multicast group; and
   forwarding, by the first network device, a second multi-destination packet belonging to the VLAN via the shortest-path multicast tree.

12. The non-transitory computer-readable storage medium of claim 10, wherein the overlay network deploys an Ethernet virtual private network, and wherein the control packet is a route update packet associated with the Ethernet virtual private network.

13. The non-transitory computer-readable storage medium of claim 10, wherein the forwarding information comprises one or more of:
   a new media access control (MAC) address learned on the VLAN at the second network device; and
   a new route determined by the second network device.

14. The non-transitory computer-readable storage medium of claim 10, wherein a respective entry in the data structure in the forwarding hardware is associated with a multicast group corresponding to a VLAN configured in the overlay network, and wherein a source of the multicast group indicated in the entry refers to a respective source of the multicast group in the overlay network.

15. The non-transitory computer-readable storage medium of claim 10, wherein the root-path multicast tree and the shortest-path multicast tree are deployed in an underlay network for the overlay network.

16. The non-transitory computer-readable storage medium of claim 10, wherein the method further comprises:
   determining, by the first network device, the second network device as a source of the multicast group;

identifying a port of the first network device correspond-
ing to the second network device based on routing
information of the first network device; and
allocating the port to the shortest-path multicast tree.

17. The non-transitory computer-readable storage
medium of claim 16, wherein the method further comprises
providing, in response to receiving the forwarding informa-
tion, a notification to a multicast daemon running on the
network device, wherein the notification indicates the sec-
ond network device as the source of the multicast group.

18. The non-transitory computer-readable storage
medium of claim 10, wherein the root-path multicast tree is
rooted at a network device of the overlay network, and
wherein the network device is configured as a Rendezvous
Point (RP) of the multicast group.

19. A computer system, comprising:
at least one processing resource;
a set of ports;
forwarding hardware; and
a storage device storing instructions executable by the at
least one processing resource to:
operate the computer system as a tunnel endpoint in an
overlay network;

receive a multi-destination packet associated with a
virtual local area network (VLAN) via an edge port
of the set of ports;
determine a multicast group assigned for distributing
multi-destination traffic of the VLAN from a data
structure stored in the forwarding hardware;
forward the multi-destination packet via a root-path
multicast tree associated with the multicast group;
receive forwarding information shared by a second
computer system in the overlay network based on a
control packet sent by the second computer system;
and
program, in the data structure stored in the forwarding
hardware, a shortest-path multicast tree associated
with the multicast group, wherein the shortest-path
multicast tree is for distributing traffic belonging to
the VLAN.

20. The computer system of claim 19, wherein the instruc-
tions executable by the at least one processing resource to:
prune the root-path multicast tree for the multicast group;
and
forward a second multi-destination packet belonging to
the VLAN via the shortest-path multicast tree.

*    *    *    *    *